Dec. 20, 1932.  F. E. PAYNE  1,891,725
BUSHING PACKING
Filed April 25, 1931

Inventor:
Frank E. Payne,
By Rector, Hibben, Davis & Macauley
Attorneys.

Patented Dec. 20, 1932

1,891,725

UNITED STATES PATENT OFFICE

FRANK E. PAYNE, OF GLENCOE, ILLINOIS, ASSIGNOR TO CRANE PACKING COMPANY, OF CHICAGO, ILLINOIS, A CORPORATION OF ILLINOIS

BUSHING PACKING

Application filed April 25, 1931. Serial No. 532,745.

My invention relates to bushing packing and to a method of making the same, being primarily concerned with devising a semi-metallic packing which will provide a maximum seal with a minimum of friction and wear in relation to the part with which it may be cooperating.

One object of my invention is to provide a semi-metallic packing composed of an anti-friction or so-called bearing metal and non-metallic packing material of a customary type, such as fibre, primary dependence being placed upon the non-metallic material for an efficient sealing contact, with the semi-metallic packing functioning to prevent undue friction and wear, the relative masses of the metallic and non-metallic parts being adjusted to most satisfactorily meet the requirements of the particular condition of operation as regards sealing and prevention of binding.

A further object is to devise a non-metallic bushing packing which comprises one or more ring-shaped, metallic inserts which are recessed in and are substantially flush with the inner surface of the bushing, the inserts being preferably composed of lead or other bearing metals, or of metallic foil.

A further object is to provide a bushing of the character described in which the disposition of the metal is such as to operate as an electrical bond between the indicated parts with the object of preventing electrolytic action, in addition to functioning as the anti-friction member of the packing.

A further object is to devise a method of making the packing noted above in which the soft metal, ring inserts are positioned by squeezing the same between two or more bushing members, this action locking all parts together to form the completed bushing and also laterally displacing a portion of the metal rings between the opposed ends of the bushing members to create the bonding part or parts of the bushing.

These and further objects of my invention will be set forth in the following specification, reference being had to the accompanying drawing, and the novel means by which said objects are effectuated will be definitely pointed out in the claims.

Figure 1:
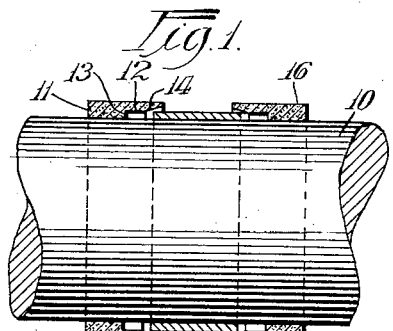
Figure 1 is an elevational view, partly in section, showing the initial stage in the manufacture of one form of my improved bushing packing.

Referring to Fig. 1, the numeral 10 designates a mandrel, upon which may be assembled the several parts of the packing preliminary to uniting the same together. A bushing 11 is placed upon the mandrel 10 and said bushing may be counterbored as at 12 to provide an internal, annular shoulder 13, with the entrance to the counterbore 12 beveled as at 14. Adjacent the bushing 11 and on the counterbored side thereof is a metallic ring 15 which also encircles the mandrel 10 and adjacent the ring 15 is a second bushing 16 which is identical with the bushing 11, but arranged on the mandrel with the counterbored side thereof in facing relation to the corresponding portion of the bushing 11.

The bushings 11 and 16 are preferably composed of a non-metallic packing substance, such as fibre, which may be suitably treated, as with graphite or other materials as may be demanded by the nature of the environment with which the packing is to be used. The metallic ring 15 is preferably of the endless type and is composed of an easily deformable metal, such as metals of the bearing class, and may be composed of spiraled, metallic foil. It has been ascertained that ordinary fibre packing swells under the action of the vapors or liquids which it is intended to seal to such an extent that it binds the tubes or other parts which it may encircle. In certain kinds of service, such as condenser operation, where it is necessary to employ ring packings to seal the condenser tubes which expand and contract in length with changes in the temperatures obtaining therein, fibre packings exert such a binding effect on the tubes as to prevent their changes in length and consequent slipping through the packing. In other words, each condenser tube is literally fixed between the packing at each end thereof, so that the reactions created by the tendency of the tube to lengthen under a rising temperature, places the tube under compression in the same manner as is exhibited by a column under load and also subject the tube sheets to bending stresses. These stresses frequently cause an early failure of the tube owing to crystallization of the metal and also a cracking of the tube sheets. The present invention, therefore, contemplates the formation of a packing composed of a fibre packing material, upon which primary dependence is placed for obtaining the necessary seal, and to associate this packing material with an anti-friction metallic insert such that the condenser tube, for example, will be free to change in length, while at the same time maintaining the necessary sealing without binding.

Referring again to Fig. 1 of the drawing, the fibre bushings 11 and 16, and the metal ring 15, having been placed upon the mandrel 10 in the general relations shown, pressure is applied to the bushings 11 and 16 in directions generally parallel with the axis of the mandrel 10 and such as to cause said bushings to move toward each other. The metal ring 15 being composed of a deformable metal, the foregoing action results in a crowding of the ring in the counterbored portions of the two bushings and a lateral displacement of a portion of the ring to provide a circumferential rib 19 which is located between the facing edges of the bushings (see Fig. 2). In said last named figure, the completed packing is shown in position on a tube 18. The beveled surfaces 14 on each bushing facilitates the entrance of the metal ring into the counterbored portion of each bushing to provide the annular portion 17 of the completed metal ring in the completed bushing.

Figure 2:
Fig. 2 is a sectional view of the completed bushing, as made according to the method illustrated in Fig. 1, the bushing being shown in operating position upon a tube.

The type of bushing shown in Fig. 2 may have the sealing areas of the bushings 11 and 16 so arranged as to provide for the necessary seal with the parts with which it is intended to cooperate, and the mass of the metal insert 17 may be similarly arranged to provide for the necessary anti-frictional contact with the tube 18. In addition, the formation of the circumferential rib 19 provides a means of establishing an electrical bond between the tube 18 and the tube sheets (not shown) in which the tube 18 may be mounted, thereby establishing a metal path for the passage of an electrical current, where the conditions of operation tend to create a state of electrolysis.

Figure 3:
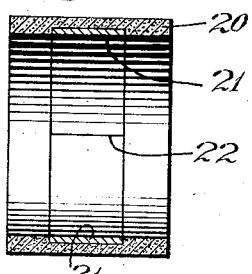
Fig. 3 is a sectional view showing a further modification of my improved packing.

In Fig. 3 is shown a modified form of my improved bushing packing which comprises a non-metallic bushing 20, in the inner wall of which may be suitably rolled a metallic ring 21 which is preferably slit as at 22 in order to facilitate the initial insertion of the metal ring within the bushing. Likewise, the bushing 20 may be counterbored to more readily receive the ring insert.

Figure 4:
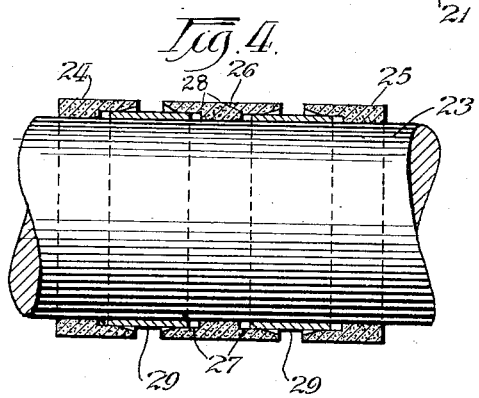
Figs. 4 and 5 are sectional views, corresponding to Figs. 1 and 2, respectively, and showing a bushing packing provided with two metallic, ring inserts.
Figure 5:
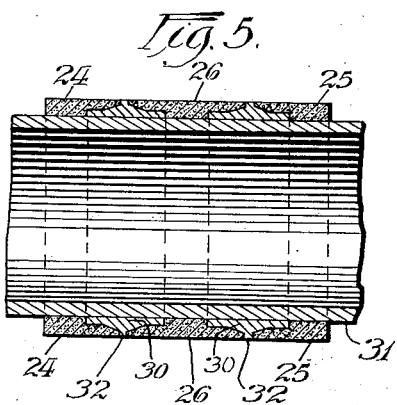

In Figs. 4 and 5 is shown a modification of the type of packing illustrated in Figs. 1 and 2, Fig. 4 illustrating a stage in the manufacture corresponding to that shown in Fig. 1. In Fig. 4, the numeral 23 designates a mandrel corresponding to the mandrel 10 and on said mandrel are placed bushings 24 and 25 in spaced relation having generally the shape and arrangement illustrated more particularly by the bushing 11 in Fig. 1, and between the bushings 24 and 25 is positioned on the mandrel 23 a third bushing 26 which is counterbored from opposite ends thereof as at 27 to provide internal, annular shoulders 28. Between the bushings 24 and 26 is positioned a metal ring 29 and a similar ring is located between the bushings 25 and 26, the total assembly therefore corresponding in substantial detail with that shown in Fig. 1, except that in the former case three non-metallic bushings and two metallic rings are employed. As in the first instance, pressure is now applied to the end bushings 24 and 25 in directions opposed to each other to thereby crowd the two metal rings 29 within the indicated, counterbored portions of the fibre bushings and to thereby create the metallic ring inserts 30 and the circumferential ribs 32 (see Fig. 5). In Fig. 5, the completed packing is shown as mounted on a tube 31.

Figure 6:
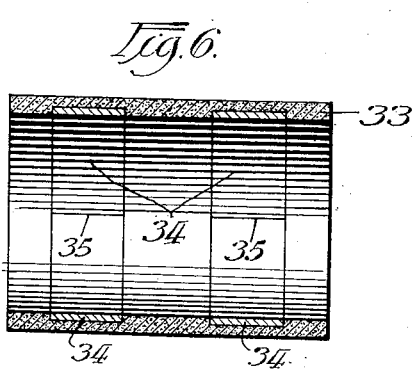
Fig. 6 is a view similar to Fig. 3, showing a type of bushing which is in all respects identical with that shown in Fig. 3, except that the former comprises two ring inserts.

Referring to Fig. 6 which shows a further modification of the type of packing illustrated in Fig. 3, the numeral 33 designates a non-metallic bushing within whose inner wall is rolled or otherwise recessed a pair of metallic rings 34, each of which may be slit as at 35 in order to facilitate their proper positioning.

My improved packing therefore affords a convenient type in that provision is made not only for establishing the required seal under any given condition, but it in addition incorporates the advantage of permitting movement of the part with which it may be coacting without undue binding thereon, and with a consequent lengthening of its useful life. The packing therefore embodies every sealing advantage of the fibre packing, and the wearing qualities of the metal packing and is therefore useful under conditions where fibre packing alone has been found to be impractical. Any of the foregoing types are susceptible of relatively easy manufacture at comparatively low cost, the methods of manufacture suggested above being susceptible of such changes as may be necessary, it being understood that the component parts of the type illustrated in Figs. 1 and 4 may be otherwise mounted and handled than on a mandrel. The latter instrument, however, possesses the important advantage of serving to align the respective parts of the packing, as well as insuring the substantially flush relation of the inner walls of the several parts when the packing is completed.

While I have shown one set of elements and combinations thereof for effectuating my improved packing, it will be understood that the same is intended for purpose of illustration only, and in no wise to restrict my device to the exact forms and structures shown, for many changes may be made therein without departing from the spirit of my invention.

I claim:

1. Packing comprising a pair of non-metallic bushings and a metallic ring insert located interiorly of both of said bushings to lie substantially flush with their respective inner surfaces and including a portion projecting between the opposed ends of said bushings for service as an electrical bond.

2. Packing comprising a plurality of non-metallic bushings and a metallic ring insert seated in the opposed ends of each adjacent pair of said bushings to lie substantially flush with their respective inner surfaces and including a portion projecting between said opposed ends for service as an electrical bond.

3. Packing comprising a pair of fibre bushings and an anti-friction, metal ring insert located interiorly of both of said bushings to lie substantially flush with their respective inner surfaces and including a portion projecting between the opposed ends of said bushings for service as an electrical bond.

4. Packing comprising a pair of fibre bushings and a ring insert composed of metallic foil located interiorly of both of said bushings to lie substantially flush with their respective inner surfaces and including a portion projecting between the opposed ends of said bushings for service as an electrical bond.

5. The method of making a semi-metallic bushing packing consisting in placing a deformable metallic ring between a pair of non-metallic bushings partially counterbored to receive the ring, the counterbored portions of said bushings facing each other, and then squeezing the ring between the bushings to thereby lock the assembly together while internally supporting the bushings and rings.

6. The method of making a semi-metallic bushing packing consisting in placing a deformable, metallic ring between a pair of non-metallic bushings each counterbored to a depth less than one-half the length of the ring, the counterbored portions of said bushings facing each other, and then squeezing the ring between the bushings while internally supporting the bushings and rings to thereby lock the assembly together and to cause a portion of said ring to move outwardly and form a circumferential rib located between the opposed ends of said bushings.

7. The method of making a semi-metallic bushing packing consisting in placing a deformable metallic ring between a pair of non-metallic bushings partially counterbored to receive the ring, the counterbored portions of said bushings facing each other, completely supporting the interior of said bushings and ring, and then squeezing the ring between the bushings to thereby lock the assembly together, the interior support of the bushings and ring causing their respective inner surfaces to assume a substantially flush relation.

8. Packing comprising a pair of non-metallic bushings having counterbored portions facing each other and a metallic ring insert seated in said portions, the inner surfaces of the bushings and rings being substantially flush with each other, and a rib formed on said ring intermediate the ends thereof and projecting between the opposed ends of said bushings for service as an electrical bond.

9. Packing comprising a plurality of non-metallic bushings, the opposed ends of each adjacent pair of said bushings being counterbored to a predetermined depth, a metallic ring insert seated in each complementary pair of said counterbored portions, the inner surfaces of said bushings and ring being substantially flush with each other, and a rib formed on each of said rings intermediate the ends thereof and projecting between each pair of said opposed ends for service as an electrical bond.

10. Packing comprising a pair of non-metallic bushings and a metallic ring insert located interiorly of both of said bushings to lie substantially flush with their respective inner surfaces and having a portion projecting between the opposed ends of said bushings, the outer surfaces of said portions and bushings being substantially flush with each other.

11. Packing comprising a pair of non-metallic bushings having counterbored portions facing each other and a metallic ring insert seated in said portions, the inner surfaces of the bushings and ring being substantially flush with each other, and a rib formed on said ring intermediate the ends thereof and projecting between the opposed ends of said bushings, the outer surfaces of said bushings and rib being substantially flush with each other.

In testimony whereof, I have subscribed my name.

FRANK E. PAYNE.